(12) United States Patent
Burt et al.

(10) Patent No.: US 9,095,919 B2
(45) Date of Patent: Aug. 4, 2015

(54) STICK ELECTRODE

(75) Inventors: Randall M. Burt, Mentor, OH (US);
Jon P. Chiappone, Willoughby, OH (US); Craig B. Dallam, University Heights, OH (US); Robert J. Weaver, Concord, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2087 days.

(21) Appl. No.: 11/357,862

(22) Filed: Feb. 21, 2006

(65) Prior Publication Data
US 2007/0193993 A1 Aug. 23, 2007

(51) Int. Cl.
*B23K 35/22* (2006.01)
*B23K 35/34* (2006.01)
*B23K 9/02* (2006.01)
*B23K 35/368* (2006.01)
*B23K 35/30* (2006.01)

(52) U.S. Cl.
CPC ............... *B23K 9/02* (2013.01); *B23K 35/3053* (2013.01); *B23K 35/368* (2013.01)

(58) Field of Classification Search
CPC .. B23K 35/365; B23K 35/368; B23K 35/302; B23K 35/308; B23K 35/3053
USPC ............... 219/146.1, 145.23, 146.23, 146.22, 219/146.31, 146.32
See application file for complete search history.

(56) References Cited

U.S. PATENT DOCUMENTS

| | | | |
|---|---|---|---|
| 2,871,118 A | 1/1959 | Perkins et al. | |
| 3,350,539 A | 10/1967 | Manz et al. | |
| 3,656,943 A * | 4/1972 | Heuschkel | 420/109 |
| 3,716,691 A * | 2/1973 | Baybrook et al. | 219/137 R |
| 3,745,322 A * | 7/1973 | Ito et al. | 219/137 R |
| 3,778,588 A | 12/1973 | Bishel | |
| 3,902,039 A * | 8/1975 | Lang | 219/146.1 |
| 3,919,519 A * | 11/1975 | Petersen | 219/137 R |
| 4,721,837 A | 1/1988 | Gamberg | |
| 5,192,851 A * | 3/1993 | James et al. | 219/130.51 |
| 5,365,036 A | 11/1994 | Crockett et al. | |

(Continued)

FOREIGN PATENT DOCUMENTS

| | | |
|---|---|---|
| EP | 0867520 A2 | 9/1998 |
| EP | 1 226 897 A2 | 7/2002 |

(Continued)

OTHER PUBLICATIONS

Y. Ito, M. Nakanishi, Y. Komizo, Cold cracking susceptibility of girth welding for arctic grade line pipe, Sep. 1982, vol. 4, No. 2, p. 110.*

(Continued)

*Primary Examiner* — Dana Ross
*Assistant Examiner* — Hemant Mathew
(74) *Attorney, Agent, or Firm* — Hahn Loeser & Parks LLP

(57) ABSTRACT

A stick electrode for depositing an high strength weld metal bead on a workpiece where the yield strength of the weld metal is between 85 ksi and 125 ksi irrespective of the cooling rate. The electrode deposits weld metal having 0.80-1.85% by weight manganese, 0.25-0.50% by weight molybdenum, 1.25-2.50% by weight nickel, and less than 0.07% by weight carbon, wherein the ratios of the carbon, manganese and molybdenum are adjusted to provide a carbon equivalent in deposited weld metal in the range of 0.17 to 0.30 and preferably less than 0.22.

13 Claims, 2 Drawing Sheets

(56) References Cited

U.S. PATENT DOCUMENTS

| | | | |
|---|---|---|---|
| 5,369,244 A | | 11/1994 | Kulikowski et al. |
| 5,634,988 A | * | 6/1997 | Kurebayashi et al. ........ 148/320 |
| 5,744,782 A | * | 4/1998 | Sampath et al. ........... 219/146.1 |
| 6,110,301 A | * | 8/2000 | Singh et al. ................... 148/336 |
| 6,180,920 B1 | | 1/2001 | Blankenship et al. |
| 6,188,037 B1 | * | 2/2001 | Hamada et al. ................. 219/61 |
| 6,426,483 B1 | | 7/2002 | Blankenship et al. |
| 6,953,508 B2 | * | 10/2005 | Ikeda et al. .................... 148/320 |
| 2007/0193995 A1 | | 8/2007 | Kapoor et al. |
| 2007/0251934 A1 | | 11/2007 | Kral et al. |

FOREIGN PATENT DOCUMENTS

| | | | |
|---|---|---|---|
| EP | 1435399 | A1 | 7/2004 |
| EP | 1 818 131 | A1 | 8/2007 |
| JP | 8-276293 | A | 10/1996 |
| JP | 2000-102893 | A | 4/2000 |
| JP | 2001-129683 | A | 5/2001 |
| WO | 02/12581 | A1 | 2/2002 |

OTHER PUBLICATIONS

Stick Electrode Product Catalog—Lincoln Electric Jun. 2004.
"ATOM ARC T Tech Data Sheet", www.esab.com, 3 pages.
"HOBALLOY 11018M" Hobart Brothers catalog, 2 pages.
All-Weld-Metal Design for AWS E10018M, E11018M and E12018M Type Electrodes [online], accessed via the Internet [retrieved on Feb. 1, 2011], URL: <https://www.aws.org/wj/supplement/june99/SURIAN.pdf>, 12 pages.
Examination Report issued in related Australian Patent Application No. 2007200924, Aug. 25, 2009, 2 pages (corresponds to U.S. Appl. No. 11/466,917).
Partial European Search Report dated Sep. 14, 2010 in European Patent Application No. EP 07 10 3527, 8 pages (corresponds to U.S. Appl. No. 11/466,917).
Lincoln Electric, "Stick Electrode Product Calalog" dated Jun. 2004.
Examiner report from corresponding Brazilian Application No. PI0602507-2, dated Dec. 12, 2014.

* cited by examiner

STICK ELECTRODE

The present invention relates to the art of electric arc welding and more particularly to a novel stick electrode that deposits metal on a workpiece with a yield strength in the general range of 85 ksi to 125 ksi with a reduced sensitivity of the yield strength to the cooling rate of the deposited molten metal.

BACKGROUND OF INVENTION

In many military applications, welding is to be performed by a stick electrode in a manner to produce a high yield strength. The stick electrode used in military applications must produce a yield strength in the general range of 85 ksi to 125 ksi. To accomplish such high yield strength, the coating of the stick electrode must have a substantial amount of alloying agents, such as nickel, manganese and molybdenum. The tensile strength for any given alloy is determined by the cooling rate, as it relates to the continuous cooling transformation curve (CCT) of the particular steel alloy. The strength of the weld metal bead as well as the cooling rate sensitivity relates to the composition, as well as the carbon content of the steel and the actual cooling rate for the molten weld metal. It has been found that the cooling rate changes drastically according to the size and preheat of the workpiece and the amount of electrical energy used in the stick welding process. It is desirable to minimize the yield strength sensitivity to the different cooling rates, while maintaining the alloy composition of the weld metal so that the high yield strength in the range of 85 ksi to 125 ksi can be assured in the resulting weld. Consequently, there is a need to create a stick electrode that minimizes the cooling rate sensitivity so the resulting weld is within the high yield strength specification for both an extreme high cooling rate and an extreme low cooling rate.

THE PRESENT INVENTION

The present invention relates to a stick electrode that minimizes yield strength sensitivity to cooling rate, while obtaining a high yield strength weld metal deposit. While minimizing the cooling rate sensitivity of the resulting weld metal, the electrode still meets the military specification on final yield strength. Thus, the electrode is alleged to be within the applicable military specification and uses a novel alloy formulation. This formulation produces the lowest possible carbon equivalent in the weld metal deposit, while still meeting the minimum strength requirement when using the novel electrode to weld on a workpiece using a welding heat creating a low cooling rate. Such a welding operation results when the workpiece is relatively thin plates heated to a high interpass temperature, such as about 300° F. This weld has a low cooling rate. The novel electrode still created a weld metal having a yield strength in the specification limits of 85 ksi to 125 ksi. Thus, even at a low cooling rate, which inherently provides a minimum yield strength for the weld metal, the resulting weld metal using the present stick electrode is within the desired strength range. Consequently, the novel stick electrode of the present invention allows welding with a low cooling rate because the cooling rate sensitivity of the electrode is minimized. In a like manner, when a high cooling rate is used, the novel electrode still accomplishes high yield strength, but not excessively high yield strength. Thus, the present invention involves a novel stick electrode that obtains at least a minimum yield strength irrespective of low cooling rate created by a high temperature, thin workpiece welded with a high energy and less than a maximum yield strength for a cold workpiece welded at a low temperature thereby resulting in a high cooling rate.

In accordance with the present invention there is provided a stick electrode for depositing high strength weld metal bead on a workpiece where the yield strength of the weld metal is between 85 ksi and 125 ksi, irrespective of the cooling rate. The electrode has 0.80-1.85% by weight manganese, 0.25-0.50% by weight of molybdenum, 1.25-2.5% by weight nickel and less than 0.07% by weight carbon. The relative ratio of carbon, manganese and molybdenum is adjusted to provide a carbon equivalent in the range of 0.17-0.30. Preferably, the carbon equivalent is in the range of 0.20-0.22. In this manner, the stick electrode minimizes the carbon equivalent, while using normal amounts of carbon, manganese and molybdenum to produce high strength weld metal. This electrode is used for military applications such as specification MIL-E-22200/10C. The metal rod of the electrode has a diameter in the general range of 3/32-5/32 inch. The novel electrode has low cooling rate sensitivity so the strength of the weld metal is generally insensitive to the cooling rate. This property of the novel electrode is documented by using the electrode for both a hot, high heat input on a relatively thin workpiece, high energy process with a low cooling rate as well as a low current process on a thick workpiece with a low heat input that produces a high cooling rate. Both of these cooling rate extremes result in a weld metal within the desired high yield strength requirements of the applicable military specification. Thus, irrespective of a high cooling rate or a low cooling rate, the weld metal deposit using the novel stick electrode is within military specifications for yield strength. Consequently, irrespective of the workpiece and the weld setting, the yield strength of the resulting weld metal still is within the range of about 88 ksi to 122 ksi.

The ability to minimize cooling rate sensitivity is realized by minimizing the carbon equivalent for the electrode, while still maintaining the alloying composition needed to obtain the high yield strength of the resulting weld metal. Carbon equivalent is defined by the Pcm formula which involves the carbon content, manganese content, the molybdenum content and the nickel content. Quantities of other alloy constituents are minimum and have a lesser impact on the calculated carbon equivalent. Carbon content is the strongest contributor to carbon equivalent. Since the present invention involves a steel alloy having larger amounts of manganese, molybdenum and nickel, these constituents are the primary factors with carbon for fixing the carbon equivalent. Using manganese, molybdenum and nickel allows the actual elemental carbon to be reduced to less than 0.050% by weight of the weld metal while still obtaining high yield strength associated with higher carbon alloys.

Carbon equivalent of the present invention is minimized so it is less than a given value whereby high strength caused by a high cooling rate is below the maximum allowable yield strength of the applicable military specification. Since carbon equivalent is affected only slightly by nickel, the two main elements to adjust the carbon equivalent and also required for a high yield strength weld are manganese and molybdenum. Manganese is a strong deoxidizer; therefore, manganese in the resulting weld metal alloy is reduced by the welding procedure. Consequently, the effect of the manganese on the resulting carbon equivalent is somewhat unpredictable. Recognizing this fact, the present invention emphasizes the addition of molybdenum and the reduction of manganese as they are coordinated to produce a low carbon equivalent. However, manganese cannot be completely eliminated from the electrode because it is necessary for deoxidizing the resulting weld metal. In other words, the invention involves a low amount of carbon together with controlling the amounts of manganese and molybdenum to produce a low carbon equivalent in the deposited weld metal without use of carbon. The cooling rate sensitivity of the resulting weld metal is reduced as the carbon equivalent is reduced. Manganese is included in the deposited weld metal to assure a minimum yield strength and then molybdenum is added to obtain the desired predictable low carbon equivalent. In this manner, the carbon equivalent is minimized, but the strength is retained at a level greater than 88 ksi. It has been found that the carbon equivalent should be in the general range of 0.18 to 0.30 and preferably reduced to the range of 0.2 to 0.22. This low carbon equivalent is obtained by adjusting the ratio of manganese to molybdenum, so this ratio is in the general range of 2-7 to 1 and preferably in the range of 3-4 to 1. This ratio produces the desired yield strength and a low carbon equivalent to reduce the cooling rate sensitivity of the resulting weld metal.

In another aspect of the invention, the carbon content of the weld metal is in the range of 0.03 to 0.05% by weight. This is a relatively low amount for a specification having a maximum of 0.07% carbon. By using a low amount of carbon and obtaining the carbon equivalent through controlled amounts of manganese and molybdenum, the carbon equivalent is selected to obtain the desired high yield strength. In accordance with the invention, the carbon equivalent is reduced by decreasing the carbon and controlling the ratio of manganese to molybdenum. Interpass heating of the workpiece was used to test the efficacy of the present invention; however, it may not be required when using an electrode formulated in accordance with the invention.

An aspect of the invention is a stick electrode for controlling the ratio of manganese to molybdenum in a deposited weld metal bead to a range of 2-7 to 1. This is combined with a low level of carbon where the carbon is less than 0.05% by weight of the weld metal. In this manner, the carbon equivalent in the weld metal is reduced to less than about 0.3; however, to minimize the carbon equivalent, it is reduced to the general range of 0.17 to 0.22. Minimum carbon equivalent while still using the desired alloy of the applicable military specification results in a high yield strength, even when the welding process, determined by the heat and workpiece, has a very low cooling rate.

Another aspect of the present invention is the provision of a method of welding with a stick electrode onto a workpiece. The stick electrode for depositing a weld metal bead having 0.80-1.85% by weight manganese, 0.25-0.50% by weight molybdenum and less than 0.07% by weight carbon with a carbon equivalent in the general range of 0.17-0.30. The carbon equivalent is to be minimized and is preferably 0.20-0.22. This method involves melting the electrode with generated electrical energy in the range of 30-60 kJ/in and moving the electrode along the workpiece as the electrode is melted and deposited onto the workpiece. The manganese to molybdenum ratio is in the range of 2-7 to 1. This invention also anticipates preheating of the workpiece to an interpass temperature in the general range of 100° F. to 300° F. as required by the specification.

In the electrode of the present invention, the hardenability is primarily obtained through increased molybdenum, instead of manganese. Nickel and molybdenum are recovered predictably during welding. Molybdenum increases to the electrode are coordinated with manganese reductions to obtain a given yield strength for the resulting weld metal.

An electrode providing deposited weld metal meeting the applicable military specification has been tested under two extreme conditions. The first condition involves a hot weld with a low cooling rate conducted on a ¾ inch plate with a 300° F. interpass temperature and 55 kJ/in heat input in the 1 G position. The other extreme condition tested involves a cold weld with a high cooling rate on a 1.0 inch plate with a 125° F. interpass temperature and a 31 kJ/in heat input welded in the 3 G position using a vertical up progression. The two tests of extreme conditions show the benefit of using a low carbon equivalent for the deposited weld metal, while still maintaining the desired yield strength of the resulting weld metal. The weld strength constraints for the two extreme condition tests was a minimum permissible yield strength of 88 ksi and a maximum permissible yield strength was 122 ksi. These two tests were conducted using a data acquisition system controlling the heat input for each electrode to within 4.0 kJ/in of the target heat, while the heat input along the pass was maintained within 2.0 kJ/in of the desired welding heat. The two extreme condition tests confirmed that reducing the carbon equivalent of the weld metal decreases the effect of cooling rate upon the yield strength of the resulting weld metal. The weld metal maintained its alloy recipe as defined in the applicable military specification.

The primary object of the present invention is the provision of a stick electrode for use in an application where the yield strength of the deposited weld metal is to be between about 85 ksi and 125 ksi. The alloy composition of the electrode is maintained to obtain this yield strength in the weld metal; however, the manganese and molybdenum are proportionally adjusted to reduce and minimize the carbon equivalent of the weld metal deposited by the electrode. In this manner, the weld metal has a relatively low sensitivity to cooling rate and the cooling rate determined by the heat input and workpiece constraints does not causes the yield strength to deviate from the specification.

Yet another object of the present invention is the provision of a method using the electrode, as defined above, for the purpose of welding with various heat inputs and various workpiece constraints.

These and other objects and advantages will become apparent from the following description taken together with the accompanying drawings.

PREFERRED EMBODIMENT

The present invention relates to a novel stick electrode having an alloying composition to deposit a weld metal defined by a military specification to produce a weld metal with a yield strength between 88 ksi and 122 ksi. This new electrode deposits a weld metal with reduced carbon equivalent as defined by the Pcm formula so the weld metal has a low sensitivity to variations in the cooling rates. The formula is:

$$Pcm = C + \frac{Si}{30} + \frac{Mn + Cu + Cr}{20} + \frac{Mo}{15} + \frac{Ni}{60} + \frac{V}{10} + 5B$$

Figure 1A:
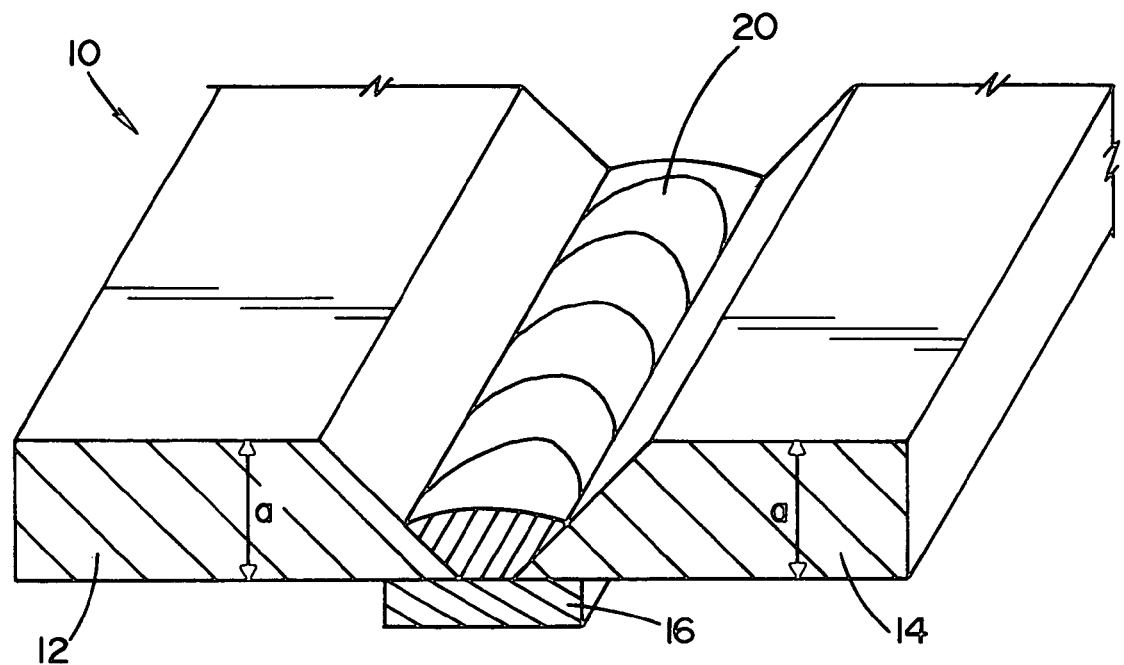
FIG. 1A is a partial cross-sectional view illustrating the test workpiece for the present invention when using a cold plate with low heat input to produce a high cooling rate in the deposited weld metal.
Figure 1B:
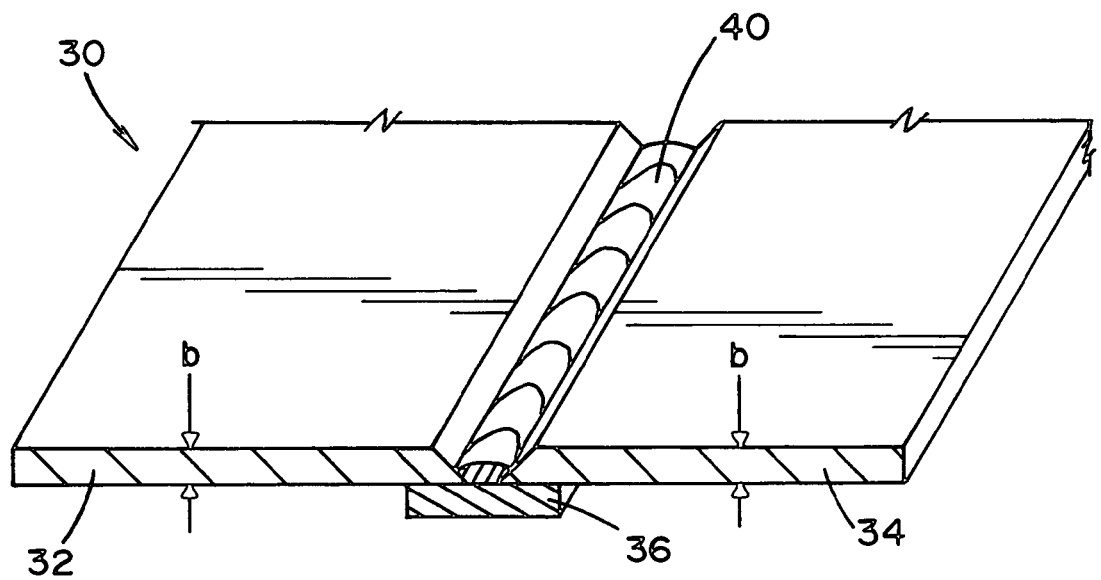
FIG. 1B is a view similar to FIG. 1A wherein the test workpiece is pre-heated and a high welding energy is used to produce a low cooling rate for the weld metal deposited by an electrode constructed in accordance with the invention; and, FIG. 2 is a graph of the carbon equivalent related to yield strength of the weld metal for several electrodes used to perform the two tests conducted on electrodes constructed in accordance with the present invention showing the effect of reducing the carbon equivalent, a parameter that reduces the sensitivity of the weld metal to cooling rate.

To test the efficacy of this new electrode, two extreme condition test procedures have been employed. The first extreme condition test procedure uses the schematic illustrated workpiece of FIG. 1A. In this test procedure, workpiece 10 with two plates 12, 14 has a thickness a and a backing plate 16. Thickness a is selected to be 1.0 inches. In this first test, an extreme welding process was performed wherein the workpiece is relatively thick and low welding heat is used to produce an extremely high cooling rate. Such a high cooling rate produces a high yield strength in a particular deposited steel having a given carbon content. Under the first extreme condition test, workpiece 10 had an interpass temperature of 125° F. A number of electrodes were tested with different carbon equivalents. A low heat input was used in the welding process for each electrode to deposit weld metal pass 20. The welder for the stick electrode was set to produce about 30 kJ/in. Thus, deposited weld metal pass 20 for each electrode was subjected to a high cooling rate. To test the novel electrode for the other extreme of cooling rate, a second test was conducted using workpiece 30, shown in FIG. 1B. In this second extreme cooling rate, a low cooling rate was obtained by pre-heating workpiece 30 formed from thin plates 32, 34, each having a thickness b, and a backing plate 36. In the second test thickness b was ¾ inch. Pre-heating workpiece 30 to 300° F. as the interpass temperature, was combined with a high welding heat of 51-55 kJ/in to lay weld metal pass 40 for several electrodes having different carbon equivalents. In each of the two extreme tests, either creating a high cooling rate as shown in FIG. 1A or a low cooling rate as shown in FIG. 1B, the heat input to the welding process was maintained within 4 kJ/in during the total welding process. These tests used several ⅛ inch electrodes constructed in accordance with the present invention and having the composition falling in the percentage shown in Table 1.

TABLE 1

| | Hot Plate Std Dev | Average | | Cold Plate Std Dev | Average | Mil. Spec |
|---|---|---|---|---|---|---|
| % B | 0.000 | 0.000 | % B | 0.000 | 0.000 | |
| % C | 0.004 | 0.042 | % C | 0.002 | 0.046 | 0.07 Max |
| % Cr | 0.0112 | 0.080 | % Cr | 0.005 | 0.061 | 0.4 Max |
| % Cu | 0.015 | 0.030 | % Cu | 0.015 | 0.032 | |
| % Mn | 0.047 | 1.493 | % Mn | 0.058 | 1.608 | 0.80-1.85 |
| % Mo | 0.019 | 0.416 | % Mo | 0.014 | 0.422 | 0.25-0.5 |
| % Ni | 0.055 | 2.219 | % Ni | 0.031 | 2.217 | 1.25-2.5 |
| % P | 0.003 | 0.017 | % P | 0.003 | 0.016 | .025 Max |
| % Si | 0.027 | 0.395 | % Si | 0.031 | 0.469 | 0.6 Max |
| % S | 0.002 | 0.006 | % S | 0.001 | 0.007 | 0.017 Max |
| % V | 0.000 | 0.008 | % V | 0.000 | 0.008 | 0.05 Max |
| $C_{eq}$ | 0.007 | 0.204 | $C_{eq}$ | 0.007 | 0.214 | n/a |

In the electrodes used for the two extreme condition tests, the carbon content is maintained relatively low and it is in the range of 0.03-0.06 and preferably in the range of 0.04-0.05. The ratio of manganese to molybdenum in the electrode is maintained in the range of 4-8 to 1. This gives a weld metal ratio of about 2-7 to 1. The manganese and molybdenum affect the carbon equivalent of the alloy forming weld metal 20, 40. Manganese is somewhat volatile and is partially consumed to deoxidize the weld metal; consequently, in the present invention manganese is reduced and molybdenum is increased within the specification as set forth in Table 1. The two extreme condition tests set forth in FIGS. 1A, 1B to establish the merits of the present invention, are performed many times using weight percentages of manganese and molybdenum that vary slightly and different carbon equivalents of the weld metal. The carbon equivalent is determined by the Pcm formula, wherein the main constituents of the specified alloy contributing to the carbon equivalent are carbon, manganese and molybdenum and, to a lesser extent, nickel. The invention involves low carbon in the weld metal and the carbon equivalent controlled by manganese and molybdenum.

In calculating the carbon equivalent for the alloy of weld metal pass 20, 40, the amount of nickel has only ¼ of the impact to carbon equivalent as does molybdenum. Thus, in conducting the series of tests on many electrodes to determine the yield strength of weld metal 20, 40 for different carbon equivalents, the amount of manganese, molybdenum and nickel are adjusted in accordance within the standard recipe. This adjustment must maintain these constituents within the determined specification. The ratio of manganese to molybdenum is reduced to the range of 2-7 to 1. This range of ratios elevates the impact of molybdenum to maintain better consistency for the calculated carbon equivalent of successive electrode used in performing the tests for the extreme high cooling rate procedure of FIG. 1A or the extreme low cooling rate procedure of FIG. 1B. The adjustment of manganese, molybdenum and nickel of the electrodes are within the preferred range set forth in Table 2 for different sized electrodes.

TABLE 2

| | Weight Percent of Electrode | | | | | |
|---|---|---|---|---|---|---|
| | 3/32" | | 1/8" | | 5/32" | |
| | Min. | Max. | Min. | Max. | Min. | Max. |
| C | 0.032 | 0.045 | 0.035 | 0.048 | 0.037 | 0.052 |
| Mn | 1.83 | 2.16 | 1.85 | 2.15 | 1.93 | 2.24 |
| Ni | 1.54 | 1.69 | 1.50 | 1.66 | 1.56 | 1.73 |
| Mo | 0.28 | 0.35 | 0.27 | 0.35 | 0.28 | 0.37 |

The minimum weight percent of electrode was calculated using the minimum specifications for the alloys used in the coating and the minimum specifications for the cored electrode and the minimum % coating allowed. They were rounded down to the next 0.01%. The other elements for 3/32 inch and 5/32 inch electrodes are similar to the amounts disclosed in Table 1.

The maximum weight percent of electrode was calculated using the maximum specifications for the alloys used in the coating and the maximum specifications for the cored electrode and the maximum % coating allowed. They were rounded up to the next 0.01%.

Figure 2:
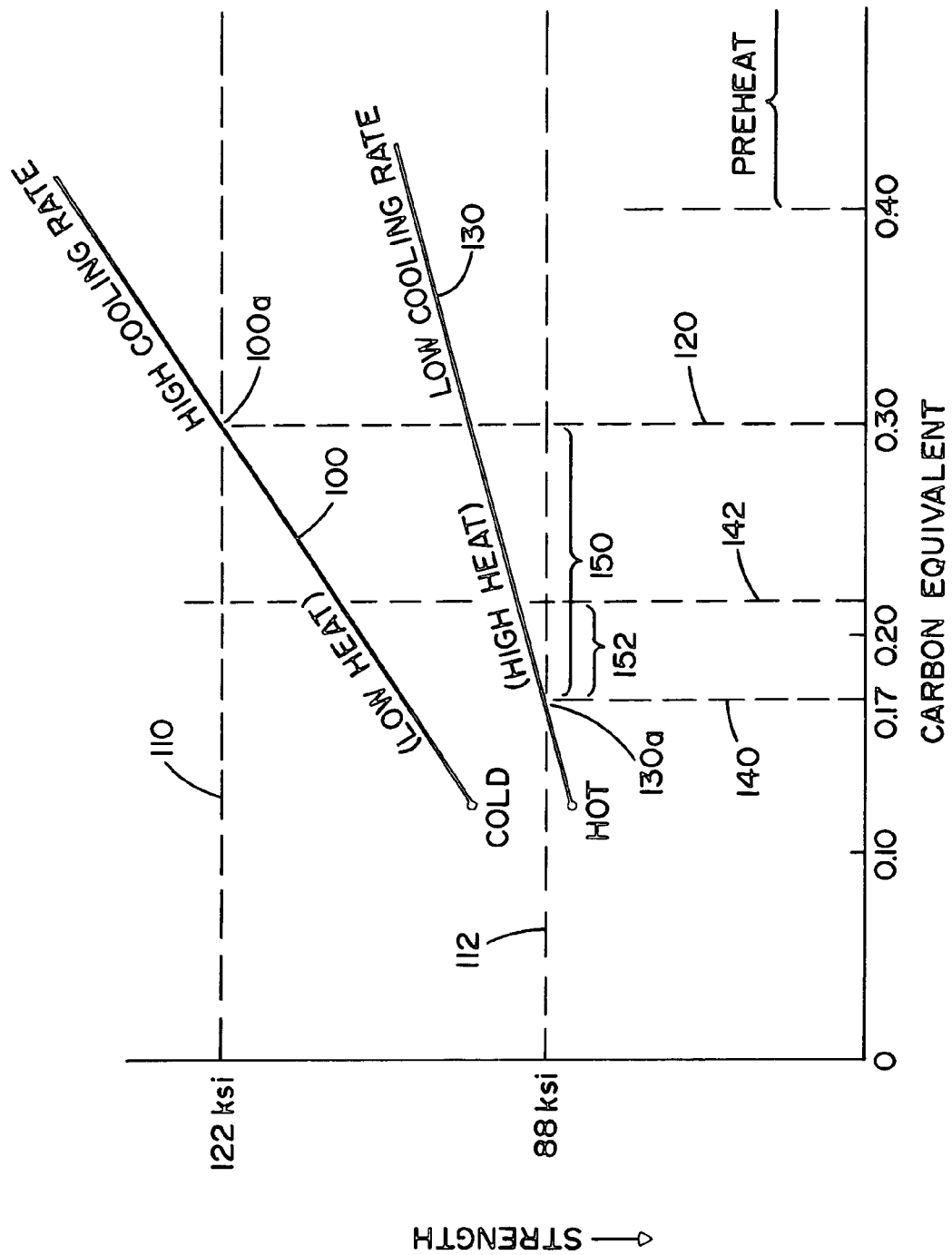

When adjusting manganese and molybdenum levels of the electrode within ranges shown in Table 2 the manganese to molybdenum ratio maintained in the weld deposit is in the range of about 2-7 to 1, and is preferably about 3-4 to 1. Tests on several such electrodes were conducted with several carbon rates using a very high cooling rate or a very low cooling rate. The tests of such electrodes conducted at extreme low cooling rate were each evaluated by testing the yield strength and then measuring the constituents of each individual weld metal of each test. The average percent by weight and the standard deviation thereof are set forth on the left two columns of Table 1. The low cooling rate test conducted as illustrated in FIG. 1B had the average electrode composition and standard deviation set forth in the next column of Table 1. These percentages must be within the military specification stated in the last column of Table 1. Each of the tests involved an electrode adjusted to change the carbon equivalent of the weld metal to allow construction of the graph shown in FIG. 2 which is the measured yield-strength for the various test electrode having different adjusted carbon equivalents. Tests on several electrodes were conducted in accordance with the procedure explained using the workpiece of FIG. 1A. The tests using several carbon equivalents produced the yield strength line 100 intersected high level 110 (122 ksi) at point 100a as shown in FIG. 2. This point 100a corresponded to a carbon equivalent in the general area of 0.30 as indicated byline 120. The test conducted using the procedure set forth in FIG. 1B was used to generate curve 130 intersecting low level yield strength 112 at point 130a. The curves 100, 130 of FIG. 2 are represented as straight lines; however, that is to simplify the basic concept that carbon equivalents between two levels, such as 0.17 at line 140 and 0.30 at line 120 still maintain yield strength within the military specification.

In accordance with the invention, the carbon equivalent of the weld metal is lower than an upper level, such as 0.30. Consequently, the invention can be practiced with a carbon equivalent having range 150; however, this range is not the preferred implementation of the invention. The preferred concept involves minimizing the ca bon equivalent. In practice the carbon equivalent of the novel electrode is controlled to be about 0.20 to 0.22. The carbon equivalent in practicing the invention can be reduced to even a lower level, such as about 0.17 or 0.18 as represented by the line 140. The preferred range of the carbon equivalent 152 is between line 140 and line 142 of the graph shown in FIG. 2. Thus, the invention involves a stick electrode within the composition required to obtain a yield strength in the weld metal between about 88 ksi, level 112 and 122 ksi (level 110) with the manganese and molybdenum adjusted to produce a low level carbon equivalent of the weld metal which is less than a high level such as 0.30, but preferably at a reduced level, such as 0.17-0.22. To decrease the uncertainty of the carbon equivalent for the electrode, the ratio of manganese to molybdenum in the electrode is in the range of 2-7 to 1 and preferably between 3-4 to 1. Thus, manganese is decreased and molybdenum is increased. Carbon itself in the electrode and weld metal is maintained at a low level, such as less than 0.06 and, preferably, in the general range of 0.04 to 0.06. This defines the constraints for the stick electrode constructed in accordance with the present invention and the deposited weld metal. The average yield strength, tensile strength and elongation for the deposited weld metal by many electrodes obtained by the two extreme condition tests of FIGS. 1A, 1B are set forth in Table 3.

TABLE 3

|  | Average |
|---|---|
| FIG. 1B Tests (Curve 130) | |
| Yield Strength 0.2% Offset Method (ksi) | 93 |
| Tensile Strength (ksi) | 104 |
| Elongation (%) (2 in. Gage Length) | 24 |
| FIG. 1A Tests (Curve 100) | |
| Yield Strength 0.2% Offset Method (ksi) | 113 |
| Tensile Strength (ksi) | 119 |
| Elongation (%) (2 in. Gage Length) | 20 |

In producing the stick electrodes for conducting the tests resulting in curves 100, 130 in FIG. 2, the metal alloy for the deposited weld metal is selected to be within the specification. The amount of manganese is reduced to an amount which will still guarantee an elevated yield strength of 88 ksi. Then the amount of molybdenum is adjusted so the ratio of manganese to molybdenum in the deposit is in the range of 2-7 to 1 and preferably in the range of 3-4 to 1. The ratio of magnesium to molybdenum in the electrode is generally 5-8 to 1. Molybdenum is employed to adjust the chemical equivalent using the Pcm formula emphasizing manganese, molybdenum and nickel as presented in Table 2. The carbon equivalent of the weld metal is in the range of 0.15-0.35, i.e. at 0.20 to 0.22. The novel electrode has no added chromium. The Military Specification allows up to 0.40% chromium, but the novel electrodes use less than 0.10% chromium to decrease its effect in the welding process. After the electrode alloy has been formulated and the electrode has been made, two electrodes with the same carbon equivalent are tested in the two extreme cooling rate conditions explained in connection with FIGS. 1A, 1B. The two electrodes with the same equivalent are then tested in succession and are at the two extremes to generate curves 100, 130 as shown in FIG. 2. This test procedure illustrates the advantage of the present invention where the carbon equivalent of the weld metal is reduced to reduce the cooling rate sensitivity and still obtain the necessary yield strength for the specification to which the electrode is being applied. In the novel electrode, the preferred range of carbon is 0.03 to 0.06, of manganese is 1.80 to 2.30 and of molybdenum is 0.25 to 0.40. These are percentages by weight of the electrode. The preferred carbon equivalent of the weld metal is 0.20-0.22. After testing, novel electrodes are manufactured using the formulations of Table 1 and the preferred ranges listed above. This procedure produces an electrode depositing a weld metal having low cooling rate sensitivity as established by the data contained in the graph of FIG. 2 and the properties disclosed in Table 3.

Using electrodes constructed in accordance with the invention, the weld metal deposit as compared to the Military Specification is provided in Table 4.

TABLE 4

| | Weight Percent of Weld Deposit | | | | | | | |
|---|---|---|---|---|---|---|---|---|
| | Military Spec. | | 3/32" | | 1/8" | | 5/32" | |
| | Min. | Max. | Min. | Max. | Min. | Max. | Min. | Max. |
| C | N/A | 0.07 | 0.034 | 0.045 | 0.034 | 0.048 | 0.036 | 0.050 |
| Mn | 0.80 | 1.85 | 1.20 | 1.62 | 1.26 | 1.72 | 1.30 | 1.75 |
| Ni | 1.25 | 2.5 | 2.20 | 2.50 | 2.20 | 2.50 | 2.20 | 2.50 |
| Mo | 0.25 | 0.50 | 0.42 | 0.50 | 0.42 | 0.50 | 0.42 | 0.50 |

The broad range of carbon, manganese, nickel and molybdenum of Table 4 practices the invention, however the preferred ranges are set forth in Table 5.

TABLE 5

| | Target Weight Percent of Weld Deposit | | | | | |
|---|---|---|---|---|---|---|
| | 3/32" | | 1/8" | | 5/32" | |
| | Min. | Max. | Min. | Max. | Min. | Max. |
| C | 0.037 | 0.042 | 0.037 | 0.045 | 0.039 | 0.047 |
| Mn | 1.27 | 1.55 | 1.33 | 1.65 | 1.37 | 1.68 |
| Ni | 2.10 | 2.45 | 2.10 | 2.45 | 2.10 | 2.45 |
| Mo | 0.42 | 0.50 | 0.42 | 0.50 | 0.42 | 0.50 |

The present invention relates to a unique stick electrode for high yield strength, which electrode maintains the desired metallurgical constraints for the electrode while reducing its sensitivity to changes in cooling rates. Thus, irrespective of the extreme cooling rates by various heat inputs and various types of workpieces and temperatures thereof, the electrode still maintains a yield strength within the desired range which range in the present invention is between about 85 ksi and 125 ksi. The original claims of this disclosure are incorporated by reference herein.

Having thus defined the invention, the following is claimed:

1. A stick electrode for providing a high strength weld on a steel alloy workpiece comprising a high strength weld metal bead to be deposited on said workpiece where a yield strength is from about 85 ksi to 125 ksi and a tensile in a range from 104 ksi to 119 ksi with reduced sensitivity to a cooling rate of said deposited weld metal bead,
   wherein said deposited weld metal bead consists essentially of:
      about 0.8-1.85% by weight manganese,
      about 0.25-0.5% by weight molybdenum,
      about 1.25-2.5% by weight nickel,
      less than about 0.07% by weight carbon,
      less than about 0.4 by weight chromium,
      less than about 0.025% by weight phosphorus,
      less than about 0.6% by weight silicon,
      less than about 0.017% by weight sulfur,
      less than about 0.05% by weight vanadium,
      no boron, and
      a ratio of Mn/Mo in said deposited weld metal bead ranges from about 2-7:1,
   wherein said electrode comprises:
      1.8-2.3% by weight manganese,
      0.25-0.5% by weight molybdenum,
      1.25-2.5% by weight nickel,
      less than about 0.1% chromium,
      a ratio of Mn/Mo in said electrode ranges from about 4-8:1,
ratios of carbon, manganese and molybdenum in said electrode adjusted to provide a carbon equivalent (Pcm) in said deposited weld metal bead in the range of about 0.15-0.35 as calculated by the formula:

$$Pcm = C + \frac{Si}{30} + \frac{Mn + Cu + Cr}{20} + \frac{Mo}{15} + \frac{Ni}{60} + \frac{V}{10} + 5B,$$

wherein a combination of carbon and ratio of Mn/Mo produces a lower carbon equivalent in said weld metal bead deposit while still meeting said yield strength of from about 85 ksi to 125 ksi and said tensile strength in a range from 104 ksi to 119 ksi than if said yield strength and said tensile strength were achieved by an addition of carbon alone, and additionally reducing yield strength sensitivity to the cooling rate.

2. The stick electrode as defined in claim 1, wherein said molybdenum in the electrode is in the range of about 0.25 to 0.4% by weight of electrode.

3. The stick electrode as defined in claim 2, wherein said nickel in the electrode is in the range of about 1.5 to 1.8% by weight of electrode.

4. The stick electrode as defined in claim 1, wherein said molybdenum in the electrode is in the range of about 0.25 to 0.4% by weight of electrode.

5. The stick electrode as defined in claim 4, wherein said nickel in the electrode is in the range of about 1.5 to 1.8% by weight of electrode.

6. The stick electrode as defined in claim 1, wherein said nickel in the electrode is in the range of about 1.5 to 1.8% by weight of electrode.

7. The stick electrode as defined in claim 1, wherein said carbon in the electrode is in the range of about 0.03 to 0.06% by weight.

8. The stick electrode as defined in claim 7, wherein said carbon is in the range of about 0.04 to 0.05% by weight.

9. The stick electrode as defined in claim 7, wherein said carbon equivalent of the deposited weld metal bead is in the range of about 0.2 to 0.3% by weight.

10. The stick electrode as defined in claim 1, wherein said carbon equivalent of the deposited weld metal bead is in the range of about 0.2 to 0.3% by weight.

11. The stick electrode as defined in claim 10, wherein said electrode has a center metal rod with a diameter in the range of about 3/32 to 5/32 inch.

12. The stick electrode as defined in claim 8, wherein said electrode has a center metal rod with a diameter in the range of about 3/32 to 5/32 inch.

13. The stick electrode as defined in claim 1, wherein said electrode has a center metal rod with a diameter in the range of about 3/32 to 5/32 inch.

* * * * *

UNITED STATES PATENT AND TRADEMARK OFFICE
CERTIFICATE OF CORRECTION

PATENT NO. : 9,095,919 B2  
APPLICATION NO. : 11/357862  
DATED : August 4, 2015  
INVENTOR(S) : Randall M. Burt et al.

Page 1 of 1

It is certified that error appears in the above-identified patent and that said Letters Patent is hereby corrected as shown below:

In the specification

Col. 7; ln 42, delete "ca bon" and insert --carbon--.

In the claims

In Col. 9; ln 32 (claim 1, ln 4), delete "85 ksi to 125 ksi and a tensile in a range" and insert --85 ksi to 125 ksi and a tensile strength in a range--.

Signed and Sealed this  
Twenty-second Day of December, 2015

Michelle K. Lee  
*Director of the United States Patent and Trademark Office*